April 3, 1962  R. J. SHAFFER  3,028,005
PLANT PACKAGE
Filed Dec. 29, 1959  2 Sheets-Sheet 1

Robert J. Shaffer
INVENTOR.

BY Clarence A. O'Brien
and Harvey B. Jacobson
Attorneys

April 3, 1962 R. J. SHAFFER 3,028,005
PLANT PACKAGE
Filed Dec. 29, 1959 2 Sheets-Sheet 2
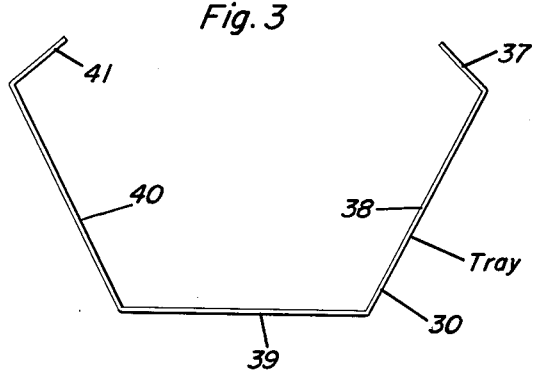
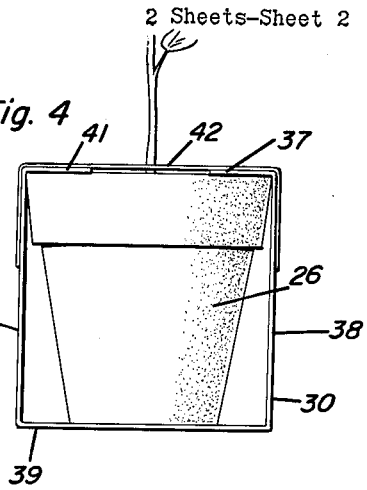
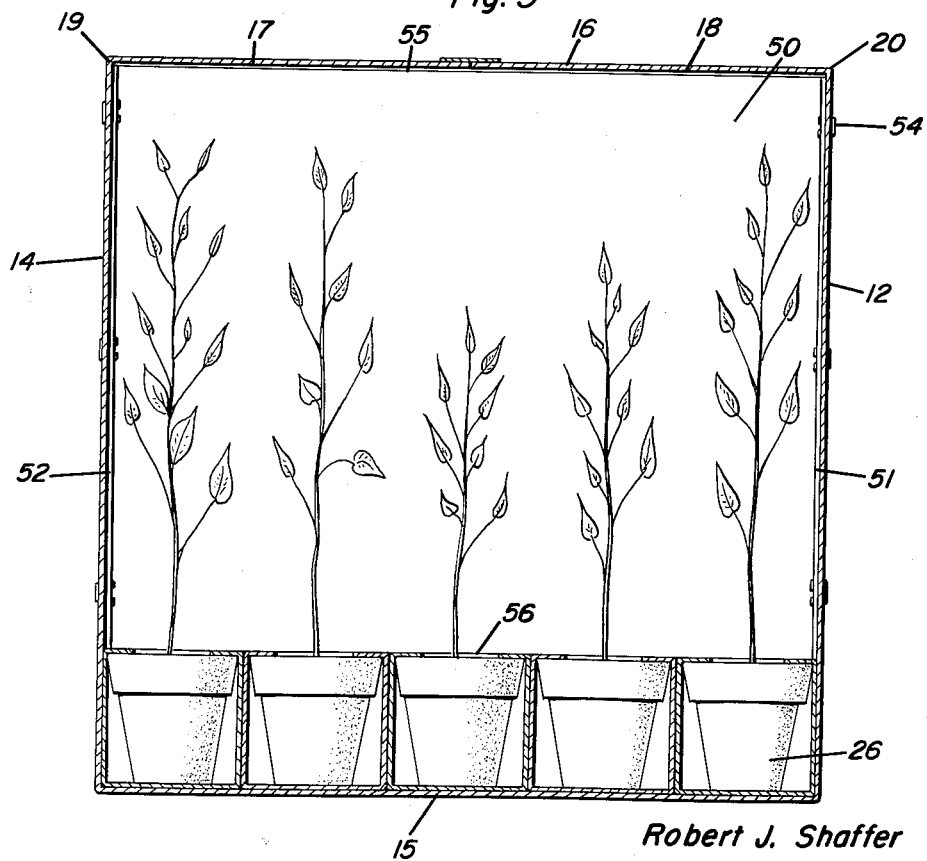
Robert J. Shaffer
INVENTOR.

United States Patent Office 3,028,005
Patented Apr. 3, 1962

3,028,005
PLANT PACKAGE
Robert J. Shaffer, Aberdeen, S. Dak.
Filed Dec. 29, 1959, Ser. No. 862,537
5 Claims. (Cl. 206—65)

This invention relates to the art of packaging and more particularly to packaging plants for shipment.

A very difficult problem exists in connection with the transportation of small plants. The plants should be maintained in an orderly fashion and certainly should not fall over or move about in the package. Reference is made to plants which are maintained in a small pot so that they will remain healthy for a considerable period of time.

The present invention provides a very simple solution to this problem. The invention is embodied in a package evolved from a packaging technique which holds the small flower pots in an orderly arrangement and confined within the package so that they are incapable of shifting laterally. The package is so constructed that the pots cannot move in any direction with respect to the side walls of the package, and this is the ideal condition.

Briefly, a package in accordance with the invention may be made of any suitable material, for instance corrugated or noncorrugated cardboard and others. Very simple trays are formed of elongated panels and folded into approximately channel-shape with one or more flower pots disposed therein. The trays are placed closely adjacent and in fact, in touching relationship to each other, and they are bound around the flower pots.

Transverse partitions extend across the container and are preferably secured to opposing sides thereof. These partitions serve a dual function. The first function is to maintain the trays immovable with reference to the bottom and sides of the container. This is accomplished by having the lower edges of the partitions abut the shorter upper walls of the trays. The second function of the partitions is to reinforce the side walls, top and bottom (through the aid of the trays and actual flower pots) of the container. The partitions prevents the container from being crushed and allow a number of containers to be stacked on each other without danger of crushing.

The container which is constructed in accordance with the invention enables shipment of small plants in such a manner that neither the flower pot in which the plant grows nor the plant itself is damaged in any manner in the course of ordinary shipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an end view of the tray showing it in the partially folded condition.

FIGURE 4 is an end view of the tray showing it in a completely folded position and showing a typical flower pot located therein.

FIGURE 5 is a sectional view on an enlarged scale and taken on the line 5—5 of FIGURE 1.

Figure 1:
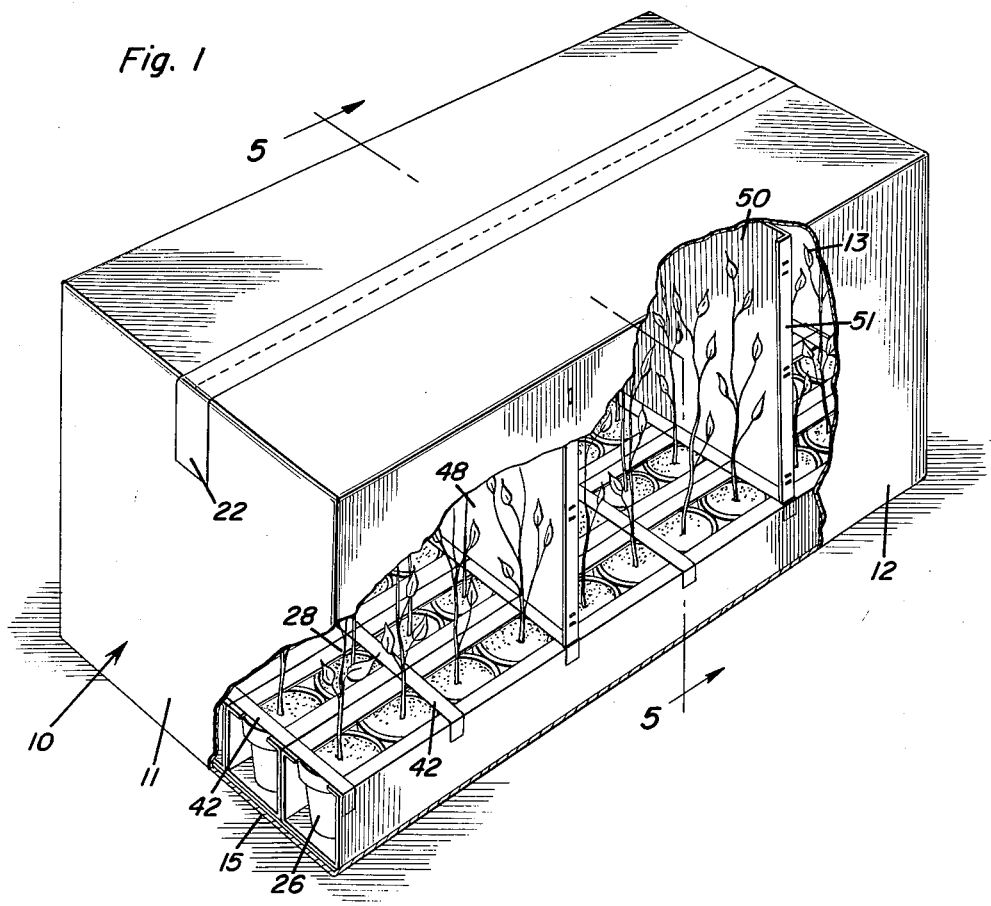
FIGURE 1 is a perspective view of a container in accordance with the invention, portions of the container being broken away to illustrate otherwise hidden details.

In the accompanying drawings there is an illustration of a rectangular container 10 which exemplifies the principles of the invention. The preferred, although not exclusive, material of construction of the container is cardboard. The container has a plurality of vertical walls 11, 12, 13 and 14, a bottom wall 15 and a top wall 16. The top wall may be made in two sections 17 and 18 connected by hinge joints 19 and 20 to the upper edges of the opposed side walls 14 and 12 respectively. The hinge joints are formed merely by creasing inasmuch as the sections 17 and 18 of top wall 16 are preferably made integral with side walls 12 and 14. An adhesive strip 22 may be used for sealing the juncture of the sections 17 and 18 of top wall 16, although other means may be resorted to serve the same purpose.

Figure 2:
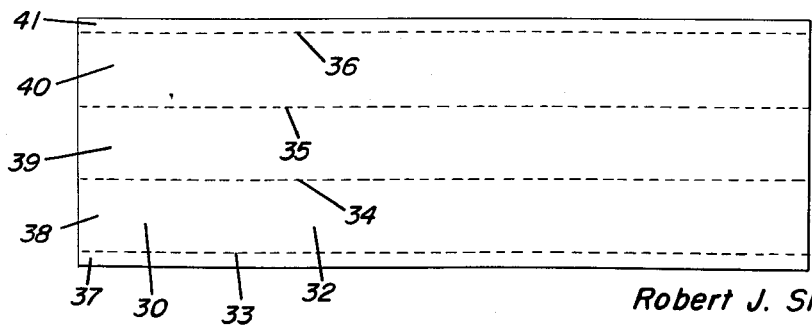
FIGURE 2 is a top view of a tray prior to folding.

The interior of the container supports flower pots 26 containing flowers 28. Small flower pots containing flowers are quite difficult to handle for shipping, as was briefly mentioned previously. To solve the problem of shipping, the flower pots 26 are arranged in rows, and each row of flower pots is supported in a special tray of generally U-shaped transverse section. A typical special tray 30 is shown in FIGURES 2, 3 and 4. It is made of a flat panel 32 of cardboard or analogous material, and there are four longitudinal fold lines 33, 34, 35 and 36 extending lengthwise of the panel. The fold lines are established by creasing, perforating, or by other usual means such as scoring. Lines 33 and 36 are adjacent to the side edges of panel 32, while lines 34 and 35 are spaced equally from each other and from lines 33 and 36 thereby defining five walls 37, 38, 39, 40 and 41 in panel 32.

The flower pots 26 of a single row are placed on the bottom wall 39 of the tray, and the side walls 38 and 40 are brought up to a parallel position (FIGURE 4), while the inturned flaps or top walls 37 and 41 are moved to a coplanar parallel position above the flower pots, resting on the upper edge of the rims thereof. This forms the tray into a channel which contains the flower pots all in a row. An adhesive strip 42 is placed across the upper surfaces of walls 37 and 41, and extended downwardly and adhered to portions of the surfaces of walls 38 and 40 (FIGURE 4). Any number of adhesive strips 42 may be used, depending on the number of plants being shipped, the capacity of the container 10 and the good judgement of the packager.

A sufficient number of trays are prepared in the above described way, to cover the entire area of the bottom 15 of the container. Consequently, the trays, being bound by the side walls and bottom of the container cannot shift laterally or endwise when placed in the container.

One or more, for instance two partitions 48 and 50, are placed in the container and fastened. Typical partition 50 is made of a cardboard panel having side flanges 51 and 52 integral therewith and fitting flush against the inside surfaces of walls 12 and 14. The flanges provide stapling members so that conventional staples 54 may be used for attaching the partition 50 to the side walls 12 and 14. The partition functions as a reinforcement for the side walls of container 10, the top of container 10 and indirectly, the bottom of container 10.

Partition 50 is so dimensioned that the upper edge 55 is closely adjacent to the top wall 16, and the lower edge 56 thereof abuts the upper surfaces of walls 37 and 41 of the trays. Consequently, the partition prevents the trays, and hence the flower pots 26 therein from shifting toward and away from the top and bottom walls of the container. It is now evident that the flower pots 26 are securely held and when packaged in the manner described above, cannot move about in the container 10. The result is that the incidence of breakage of flower pots is reduced from an appreciable quantity to something negligible, or is eliminated completely. Furthermore, the condition of the plants shipped in package 10, is very much improved because the plants cannot be moved about and damaged by such movement.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A package for potted plants, said package comprising a container having side walls, a top wall and a bottom wall, a plurality of trays, each for receiving a plurality of flower pots, in said container and in side-by-side relationship and touching each other and the side walls of the container, said trays having side walls, a bottom wall and short top walls and arranged in a generally channel-shape, means connected across and to said top walls of said trays for retention of the side walls about the flower pots, means connected with said container and contacting said trays for reinforcing said container in the region above the flower pots, and also preventing said trays and the flower pots contained therein from moving in one direction within the container, said means including a vertical partition in the container traversing the trays, secured to the side walls and engaged beneath the top wall.

2. The subject matter of claim 1 wherein said trays are made of cardboard and are of substantially channel-shape including side walls, a bottom wall in contact with the bottom of the container, top walls overlying the upper edges of the flower pots and spaced from each other to provide a space through which the plants of the flower pots may extend.

3. A plant package comprising a rectangular container including a bottom, opposed side walls, opposed end walls and a top, a plurality of elongated trays of generally U-shaped transverse section, for the reception of flower pots, mounted longitudinally in the container and resting on the bottom in end-abutting engagement with the end walls and in side-abutting engagement with each other and with the side walls, said trays including inturned longitudinal top flaps adapted to rest on the flower pots, transverse strips extending between the flaps of each tray and secured thereto for preventing lateral spreading of said trays, and vertical partitions in the container over said trays for retaining the trays against vertical movement in the container and for reinforcing the top and the side walls of said container.

4. A plant package in accordance with claim 3, wherein said partitions are in edge-abutting engagement with the top and side walls and include integral side flanges secured to said side walls.

5. A plant package comprising a rectangular container including a bottom, opposed side walls, opposed end walls and a top, a plurality of elongated trays of generally U-shaped transverse section, for the reception of flower pots, mounted longitudinally in the container and resting on the bottom in end-abutting engagement with the end walls and in side-abutting engagement with each other and with the side walls, said trays including inturned longitudinal top flaps adapted to rest on the flower pots, transverse strips extending between the flaps of each tray and secured thereto for preventing lateral spreading of said trays, and common means for retaining the trays against vertical movement in the container and for reinforcing the top and the side walls of said container, said means including partitions in the container engaged transversely across the trays and extending upwardly therefrom to the container top, said partitions including side flanges affixed to the container side walls.

References Cited in the file of this patent
UNITED STATES PATENTS

| | | |
|---|---|---|
| 2,368,753 | Elliott et al. | Feb. 6, 1945 |
| 2,649,807 | Ritter | Aug. 25, 1953 |
| 2,702,648 | Fisher | Feb. 22, 1955 |
| 2,721,022 | Billerbeck | Oct. 28, 1955 |
| 2,895,601 | Krukonis | July 21, 1959 |